(12) United States Patent
Poplack et al.

(10) Patent No.: US 9,910,810 B1
(45) Date of Patent: Mar. 6, 2018

(54) MULTIPHASE I/O FOR PROCESSOR-BASED EMULATION SYSTEM

(71) Applicant: CADENCE DESIGN SYSTEMS, INC., San Jose, CA (US)

(72) Inventors: Mitchell G. Poplack, San Jose, CA (US); Yuhei Hayashi, San Jose, CA (US); Beshara Elmufdi, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 206 days.

(21) Appl. No.: 14/921,424

(22) Filed: Oct. 23, 2015

(51) Int. Cl.
  *G06F 13/00* (2006.01)
  *G06F 13/40* (2006.01)
  *G06F 13/42* (2006.01)

(52) U.S. Cl.
  CPC ...... *G06F 13/4068* (2013.01); *G06F 13/4282* (2013.01)

(58) Field of Classification Search
  CPC .......................... G06F 13/4068; G06F 13/4282
  See application file for complete search history.

(56) References Cited

U.S. PATENT DOCUMENTS

| | | | | |
|---|---|---|---|---|
| 4,277,827 A | * | 7/1981 | Carlson | G06F 11/261 703/24 |
| 4,785,416 A | * | 11/1988 | Stringer | G06F 11/261 703/23 |
| 5,249,266 A | * | 9/1993 | Dye | G06F 9/30043 345/501 |
| 5,712,806 A | * | 1/1998 | Hennenhoefer | G06F 11/3652 326/105 |
| 5,943,490 A | * | 8/1999 | Sample | G01R 31/3177 703/23 |
| 6,473,727 B1 | * | 10/2002 | Kirsch | G01R 31/31705 703/28 |
| 6,574,590 B1 | * | 6/2003 | Kershaw | G06F 11/3656 703/23 |
| 6,598,155 B1 | * | 7/2003 | Ganapathy | G06F 9/381 711/110 |
| 6,680,874 B1 | * | 1/2004 | Harrison | G11C 8/18 327/156 |
| 7,904,288 B1 | * | 3/2011 | Beausoleil | G06F 17/5022 703/23 |
| 8,438,549 B1 | * | 5/2013 | McCoy | G06F 9/22 717/118 |
| 8,959,010 B1 | * | 2/2015 | Bershteyn | G06F 15/16 703/28 |
| 9,292,640 B1 | * | 3/2016 | Elmufdi | G06F 17/5045 |

(Continued)

*Primary Examiner* — Jing-Yih Shyu
(74) *Attorney, Agent, or Firm* — Eric L. Sophir; Dentons US LLP

(57) ABSTRACT

Systems and methods of emulating application-specific integrated circuits using multiple execution phases, where different inputs and outputs are used or produced by components of the emulation system are disclosed. For example, an OMUX may select and transmit different data over a serial bus based on the execution phase of the emulator system. In another example, a processor or cluster may capture outputted data during a first execution phase, execute instructions for a second execution phase, and then return to the capture outputted data for further processing during a next cycle of the first execution phase.

18 Claims, 8 Drawing Sheets

(56) References Cited

U.S. PATENT DOCUMENTS

| | | | |
|---|---|---|---|
| 2001/0010036 A1* | 7/2001 | Stewart | G01R 31/3177 703/23 |
| 2001/0020224 A1* | 9/2001 | Tomita | G06F 11/261 703/23 |
| 2003/0056134 A1* | 3/2003 | Kanapathippillai | G06F 1/3203 713/324 |
| 2005/0267732 A1* | 12/2005 | Beausoleil | G06F 17/5027 703/28 |
| 2006/0190237 A1* | 8/2006 | Beausoleil | G06F 17/5022 703/23 |

* cited by examiner

MULTIPHASE I/O FOR PROCESSOR-BASED EMULATION SYSTEM

CROSS-REFERENCE TO RELATED APPLICATIONS

This application is related to U.S. application Ser. No. 14/863,788, entitled "Data Routing and Multiplexing Architecture to Support Serial Links and Advanced Relocation of Emulation Models," filed Sep. 24, 2015, and U.S. application Ser. No. 14/863,872, entitled "Data Routing and Multiplexing Architecture to Support Serial Links and Advanced Relocation of Emulation Models," filed Sep. 24, 2015, each of which are incorporated herein in their entirety.

TECHNICAL FIELD

This application relates generally to integrated circuit design and testing systems, methods, and products; sometimes referred to as electrical design emulation.

BACKGROUND

Emulation systems may comprise hardware components, such as emulation chips and processors, capable of processor-based (i.e., hardware-based) emulation of logic systems, such as application specific integrated circuits (ASICs), central processing units (CPUs), graphics processing units (GPU), and the like. By executing various forms of programmable logic, the emulation chips may be programmed to mimic the functionality of nearly any prototype logic system design that is undergoing testing. This allows logic system designers to prototype their ASIC or other logic system design using processor-based emulation before expending resources manufacturing the ASIC or other logic system product.

In conventional approaches, when compiling a netlist into virtual logic the compiler produces holes in the instruction sets. That is, for each hole, there is an invalid instruction or meaningless instruction placed at that particular location in an instruction memory. Conventional approaches to multiphase execution merely allow the compiler to make multiple passes at compilation, and may allow the system to execute the instruction sets multiple times. However, what is needed for greater efficiency and more processing power is the ability to select or generate different inputs or outputs based on the phase.

SUMMARY

Disclosed herein are systems and methods of emulating application-specific integrated circuits using multiple execution phases, whereby different inputs and outputs are used or produced by components of the emulation system. For example, an OMUX may select and transmit different data over a serial bus based on the phase of the emulator system. In another example, a processor or cluster may capture outputted data during a first phase, execute instructions for a second phase, and then return to the capture outputted data for further processing during a next cycle at the first phase.

Emulation chips disclosed herein are capable of performing programmatic logic functions used for hardware-based (i.e., processor-based) logic system emulation, which may allow for prototyping ASICs or other logic systems, before actual production of the ASICs or other logic system product. During execution of an emulation test, this programmatic logic may be executed by processors of emulation chips. Emulation of logic system designs during testing may be achieved by having components of the emulation system, such as processor clusters and output multiplexers (OMUXs) repeatedly execute a predefined set of executable instructions that may be stored in the instruction memory. Each "pass" or "emulation cycle" through an instruction memory storing the instructions may result one or more multiplexer operations being executed, one for each instruction in the instruction memory. Often, the number of instructions does not match the number of instruction memory addresses. Moreover, it is also common for some instructions to request inputs that are not ready and thus the instruction produces a meaningless out. During each step, i.e., time when an instruction is executed, a result is produced, either valid or invalid. Using multiphase I/O techniques, multiplexers within the system may execute subsequent cycle (i.e., multiple passes) through an instruction set. During each cycle, the multiplexers of the system may execute the instructions of the instruction set based upon different inputs, sometimes producing different results. In other words, the results produced from some of the steps of a cycle, may vary from the results produced from those same steps in preceding cycles. In some circumstances, this variance may cause some steps to produce valid results in later cycles, where these steps would produce invalid results during preceding cycles. Multiphase I/O may be used to make more efficient use of memory space, but may also be used to deliberately vary the nature of the emulation. For example, the processors may capture outputs in a registry during a first cycle (first phase), then execute the instruction set using different inputs during a second cycle (second phase), and then later reuse in a third cycle (first phase) the earlier captured data, may allow the processor to input and output more data variations, and thus emulate more aspects of the ASIC or other logic system.

In one embodiment, a circuit emulation system comprises a bus configured to host electronic communications; and one or more emulation processor circuits, each respective processor circuit comprising: a multiplexer communicatively coupled to the bus, the multiplexer configured to, during a first clock cycle, execute an instruction of a first instruction set and transmit to the bus a first output according to the instruction, and, during a second clock cycle, execute a second instruction of the instruction set and transmit to the bus a second output according to the second instruction.

In another embodiment, a circuit emulation system comprises a bus configured to host electronic communications; and one or more emulation processor circuits, each respective processor circuit comprising a registry memory communicatively coupled to at least one processor cluster, the registry memory comprising non-transitory machine-readable storage media configured to store one or more processor outputs, or any bit available to the processor cluster (e.g., cluster inputs not generated by a local processor); and a processor cluster comprising one or more processors, each respective processor configured to, in response to receiving a latch input at a first clock cycle, store a first processor output (sometimes latched output) generated according to a first instruction, and, in accordance with a second instruction received at a second clock cycle, select the first processor output from the processor registry.

In another embodiment, a computing device-implemented method comprises, during a first execution phase: generating, by an emulation processor in a cluster of one or more processors of an emulation processing circuit, a first processor output according to a first instruction; and storing, by the emulation processor, the first output into a registry memory responsive to receive a latch input indicator with the first instruction, the registry memory comprising non-transitory machine-readable storage media configured to store one or more processor outputs, and, in some cases, any bit available to the processor cluster (e.g., cluster inputs not generated by a local processor); and during a second execution phase: generating, by the emulation processor, a second processor output based upon a second instruction; and during the first execution phase: selecting, by the emulation processor, the first processor output stored in the registry memory, from one or more data inputs.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Figure 1A:
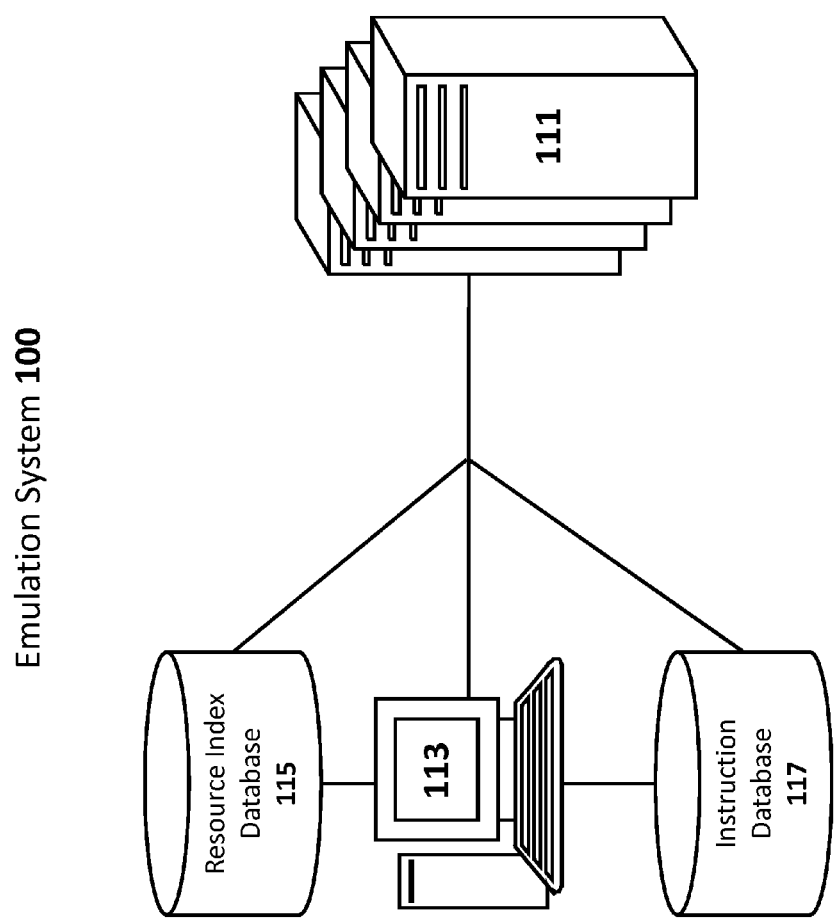
FIG. 1A shows components of an emulation system, according to an exemplary system embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

Components of an Exemplary Emulation System

Exemplary Emulation System

FIG. 1A shows components of an emulation system 100, according to an exemplary system embodiment. The exemplary system 100 may comprise emulation devices 111, a host device 113, a resource index database 115, and an instruction database 117.

Emulation devices 111 may be a collection of computing hardware capable of executing the emulation processes described herein. An emulation device 111 may comprise racks housing emulation logic boards, emulation processors, and other computing hardware designed to emulate the designs of prototype application-specific integrated circuits (ASICs) and/or other logic systems. In some embodiments, emulation devices 111 may comprise a server computer having separate processors, which may execute software modules configured to manage and control the resources and performance of the emulation system 100. Non-limiting examples these software modules may include a complier module and a configuration manager.

A compiler may be a software module, which may be executed by a host device 113 or on an emulation device 111, and is configured to receive and compile a netlist design file containing the logical gate design of an ASIC or other logic system and then generates a virtual logic file based on the compiled netlist. In other words, the compiler must "map" the ASIC's (or other logic system's) logic into the hardware components of the emulation system 100, to generate instructions for the system's 100 components to behave as the ASIC or other logic system would. The compiler module may comprise a partitioner and scheduler component or function, though it should be appreciated that the compiler may be segmented into any number of component software modules. In an opening import phase, the compiler receives the netlist and begins compiling. Here, the compiler may parse the logic gates of the netlist into a database format. A partitioner may determine which part of the netlist is going to be executed by which type of hardware resource of the system 100, and which instance. Then, a scheduler may determine for that part of the netlist which of the hardware resources should execute the part of the netlist and when in the execution cycle that logic component (e.g., gate, instruction) should be executed. The compiler may be capable of determining the status of components of the system 100, including the allocation status of particular components or whether the resource is inoperable (i.e., marked-out). In some cases, the compiler tracks this in a memory of the device executing the compiler 111, 113; and, in some cases, the compiler may query a resource index database 115 that stores status data.

A configuration manager may be software module, which may be executed by a host device 113 or a emulation device 111, and is configured to track the status and control the task performed of components of the system 100. The configuration manager may determine which components of the system 100 are available or unavailable to receive parts of the virtual logic generated by the compiler. In some cases, the configuration manager continuously polls or self-tests the emulation system 100 for faulty hardware components. The configuration manager may then update records of the components stored in a resource index database 115. In some cases, the configuration manager may determine the status of components of the system 100 when the virtual logic is being loaded into the hardware components of the emulation system 100. The determination may be based on querying a resource index database 115 or other stored file containing data about the status of hardware components (e.g. mark-out list). In some embodiments, the configuration manager may determine whether the instructions of the virtual logic should be revised (i.e., moved, transformed) from the instructions that were originally compiled. The configuration manager may be configured to automatically make this determined, or may receive instructions from an administrator through a GUI, command-line interface, or other type of user interface, to review and revise the complied instructions.

In some cases, these software modules may be executed in whole or in part on a host device 113, such as an administrator or user computer, which may communicate data and instructions associated with the respective software module to and from the emulation device 111. For example, in some cases, the host device 113 may execute a compiler module that allows a user to input a netlist design file, containing logic gate designs of the prototype ASIC or other prototype logic system, and then compiles the netlist file. The resulting virtual logic may then be transmitted or downloaded to a emulation device 111, and may execute a configuration manager module configured to track the availability of resources within the emulation system 100. It should be appreciated that the host device 113 may be any computing device comprising a processor and non-transitory machine-readable storage that render the host device 113 capable of performing the various tasks and processes described herein. Non-limiting examples of host devices 113 may include workstation computers, laptops, tablets, server computers, and the like.

An instruction database 117 may store records of virtual logic or instruction sets compiled by the compiler from netlist files. The instruction database 117 may be hosted in non-transitory machine-readable storage medium of any computing device capable of hosting the instruction database 117 and performing the various tasks and processes associated with the instruction database 117, as described herein. The instruction database 117 may receive, from a device executing the compiler 111, 113, instructions compiled from the netlist file of an ASIC or other logic system. In some cases, the instructions may be contained within a virtual logic file generated by the compiler. At download time, when the emulation system's 100 hardware components are loaded with the instructions, the instruction database 117 may transmit or otherwise provide the instructions to the components, at which point the emulation devices 111 receive the instruction sets and the instruction sets are loaded into the memories of the respective hardware components within the racks housing the emulation logic boards.

A resource index database 115 may be a database or a machine-readable computer file (e.g., mark-out list) containing records for components of the emulation system 100. The resource index database 115 or similar resource may be hosted in non-transitory machine-readable storage medium of any computing device capable of hosting the resource index database 115 and performing the associated tasks and processes described herein. The records may indicate various types of status information about components, such as allocation status, availability status (e.g., busy, broken, incompatible), execution status (e.g., busy, idle), and the like. The resource index database 115 may be periodically updated by modules of the system (e.g., configuration manager) or manually by a user, using a host device 113. The resource index database 115 may also be queried by modules throughout the emulation process.

Figure 1B:
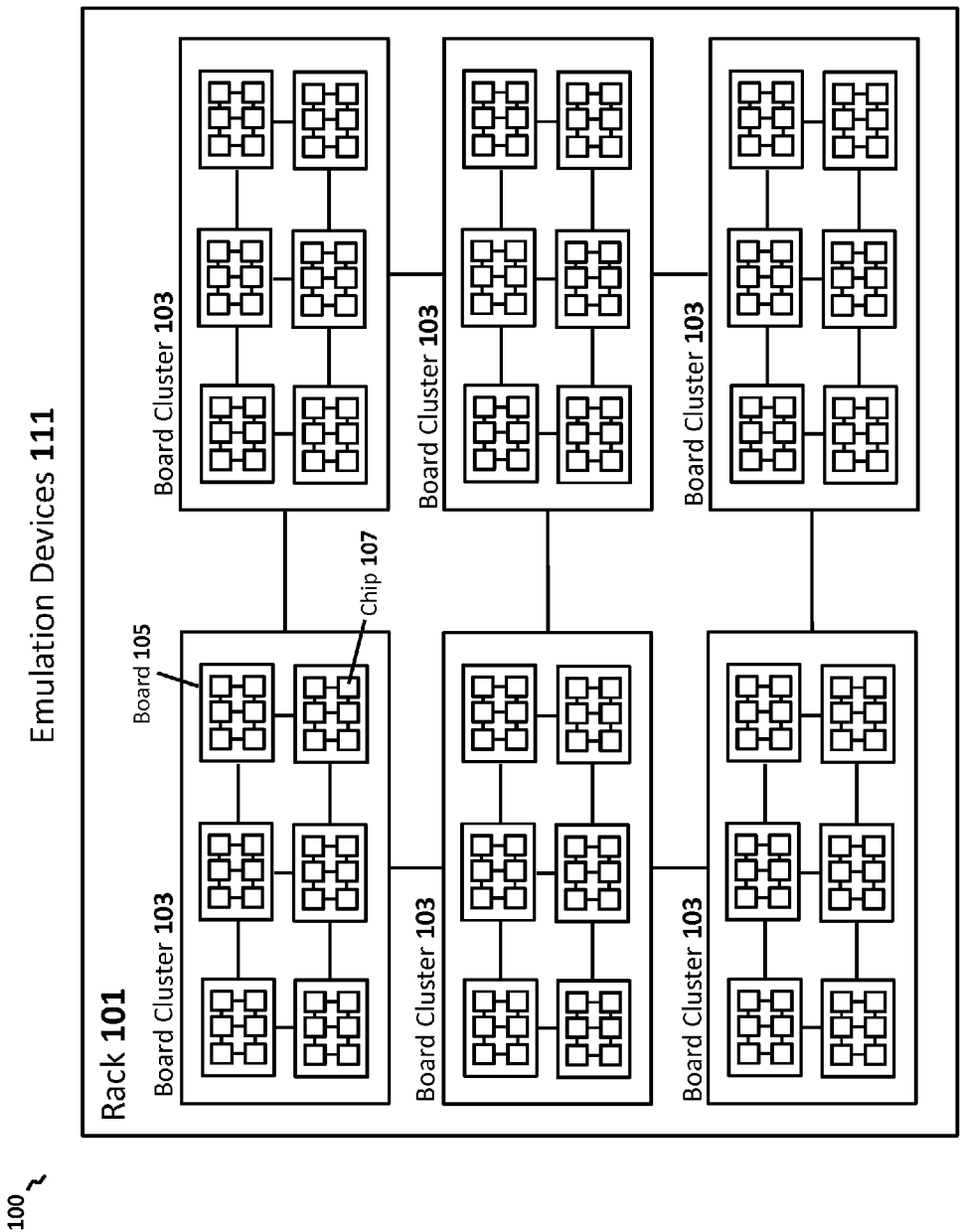
FIG. 1B is a diagram showing just one possible hierarchical configuration of components of emulation devices, according to the exemplary emulation system shown in FIG. 1A.

FIG. 1B is a diagram showing just one possible hierarchical configuration of components of emulation devices 111, according to the exemplary emulation system 100 shown in FIG. 1A. A emulation device 111 of an emulation system 100 may comprise racks 101, board clusters 103, logic boards 105, emulation chips 107, and buses of various types carrying data signals between the various components of the emulation system 100.

A rack 101 may be any physical housing for components of an emulation system 100. In the exemplary system 100, the rack 101 houses a plurality of emulation logic boards 105 that are organized into board clusters 103. In the exemplary system 100, there is only one rack 101, however some other embodiments may comprise a plurality of racks 101. In some cases, the rack 101 may be a computing device, such as a server computer or workstation computer, configured to implement various emulation functions. The rack 101 may physically house components of any type, such as board clusters 103, emulation logic boards 105, emulation chips 107, and buses hosting data signal communications.

Board clusters 103 may be logical and/or physical collectives of one or more logic boards 105. Logic boards 105 may be clustered for any number of reasons, such as creating proximity among a set of boards 105 for more efficient signal transfer and processing between the boards 105 of the cluster 103. It should be appreciated that clustering logic boards 105 is often a design consideration, and, as such, other embodiments may cluster and/or disaggregate logic boards 105 according to any number of different organizational patterns. As shown in FIG. 1B, the exemplary system 100 comprises six board clusters 103, each of the board clusters 103 comprises six logic boards 105. The board clusters 103 may be interconnected with one another by buses, which may carry data signals transmitted to and from the board clusters 103. Likewise, buses may interconnect the logic boards 105 of a particular board cluster 103, so that the logic boards 105 may transmit and receive data signals to and from other logic boards within the same board cluster 103.

Emulation logic boards 105 comprise computing hardware components capable of emulation functionality to emulate the design and functions of an ASIC or other circuitry; non-limiting examples of emulated logic systems might include ASICs, CPUs, GPUs, and ALUs, among others. The logic board 105 may comprise one or more emulation chips 107 performing the functions needed for emulation, and one or more buses interconnecting the emulation chips 107. The buses may be an optical, copper, or any other conductive material capable of carrying data signals. In operation, the buses may carry data signals transmitted to and from the emulation chips 107 of the logic board 105. In some cases, the logic board 105 may comprise one or more buses supporting communication between emulation chips 107 on the same logic board 105 (i.e., intra-board communication); and, in some cases, the logic board 105 may comprise one or more buses supporting communication between emulation chips 107 located on other logic boards 105 of the system 100 (i.e., inter-board communication).

Emulation chips 107 may comprise any number of processors capable of performing the various tasks and processes for emulating an ASIC or other logical processing circuitry, multiplexers configured to direct data signals to and from the processors, buses for communicating data between the processors, and data lanes connecting the components of a processor. An emulation chip 107 may be designed to mimic the functionality of any ASIC or other logic system design, based on programmable logic that configures the emulation chip's 107 behavior to mimic the particular ASIC. In this way, circuitry designers may prototype new ASIC designs using processor-based emulation, before actually manufacturing the ASIC and emulation device 111. The emulation chips 107 may receive a set of instructions to execute from a compiler, which may be a software module component executed by a computing device coupled to the system 100. In operation, the compiler compiles a netlist file representing the ASIC's design. The result of compiling the netlist generates virtual logic comprising instruction sets for the components (e.g., multiplexers, Boolean processors) of the emulation chips 107.

In some embodiments, the processors of the emulation chip 107 may be organized into any number of processor clusters (not shown) to efficiently share data inputs, data outputs, and data references (e.g., calls to stored data in a data array). For example, multiple processors of an emulation chip 107 may be clustered together such that the processors reference the same data array and/or instruction store. It should be appreciated that, due the modular nature of the components of the system 100, components like the processors may be organized into any number of additional or alternative organizational patterns. In some cases, clusters of processors may be clustered into clusters of clusters. However, it should be appreciated that organizational patterns are not required, and thus, in some embodiments, processors of an emulation chip 107 may not be organized into clusters at all.

Compiling Netlist Design File of a Logic System

As previously mentioned, one or more computing devices in an emulation system may execute a compiler, which may comprise one or more software modules configured to compile a netlist file representing the logic gates of a logic system, such an ASIC, and then generate virtual logic based on the compilation. The virtual logic may be in the form of one or more machine-readable computer files, database records, or any other machine-readable format. The virtual logic may comprise instructions sets compiled for resources of the emulation system. In some cases, the virtual logic may also comprise data inputs for storage into data array memories of the emulation system, which may provide an initial state for the resources and thus test various states of the logic system or initialize the logic system.

A partitioner module or function of the compiler may determine which gates of the logic system's netlist should be placed onto which emulation chip or other resource (e.g., logic board, processor, processor cluster). The partitioner may parse the netlist file into discrete code segments representing the constituent logic gates and may then determine an efficient location (i.e., resource) for each of the logic gates to be emulated. The partition may determine efficiency based on the fewest number of transmissions between resources, and then closest distance between those resources. As such, the partitioner may also try to minimize the amount of data that needs to be transmitted between different hierarchical levels of the emulation system.

A scheduler module or function of the compiler may inspect the logic gates that must be placed into locations (i.e., resources) and then determines the order in which to compute the gates. That is, the scheduler receives a set of gates and then places them as instructions for the processors to execute. Here, the scheduler may identify a location for the gates to be executed, according to how the gates have been prioritized to execute. The scheduler may identify which processor may execute the instructions for each gate, and may likewise identify each of the instruction memories associated with identified processors. The scheduler may also determine whether a particular gate would have the necessary inputs to perform the gate function. A resource cannot execute instructions for a gate before the inputs are available. However, the inputs are not available until all of the gates that feed the resource have been executed. As an example of the scheduler's ability to resolve invalid outputs, a scheduler may review a first gate and a second gate and determine that the instructions of the second gate requires as an input a bit that will be computed during execution of the first gate, which is scheduled to be executed on step 0. In this case, the scheduler would determine that the first gate should be executed prior to the second gate, and thus place the second gate at step 1 of the processor's instruction memory.

In another example, while determining a proper location for the second gate, the scheduler may determine that the second gate requires four inputs, and that only one of these inputs is determined to be ready. However, the second gate still needs three other inputs. If those other three inputs are not available yet, the scheduler may not place the second gate until those three inputs have been calculated. In this example, the remaining three inputs may be bits that are not expected to arrive until step 10 of the instruction cycle, so the second gate may be placed at step 10.

At the conclusion of this determination process, there are holes in the instructions memories where the compiler was unable to place a gate. A hole may be a location in an instruction set where the inputs are not ready, so there would be an invalid output, or where the compiler ultimately never placed a gate. The scheduler may then backfill the holes with gates that may execute on a second pass (i.e., cycle, phase) through the instruction set. After placing all of the gates, the compiler may then generate the virtual logic containing the instruction sets that are compiled with instructions and parameter values based on the where the gates were placed by the scheduler. In some complex embodiments, the processors might not be adjacent or proximately located to other processors, but instead the processors may be located at, e.g., different chips 107, different boards 105, different clusters 103, or otherwise distributed throughout the system 100. Having distributed processors means that the bits used or produced by the processors during their respective instruction sets, must be transmitted between the various processors. Transmitting the bits between the processors may be accomplished through various buses that interconnect the processors of the system 100. In these embodiments, processors having multiphase I/O communications capabilities may receive or produce varying bits in each cycle, which may be used to account for lag time created while bits are being produced or transmitted at different locations within the system 100. In other words, the holes or invalid instructions arising in instruction sets of such complex embodiments may be addressed with the help of the disclosed multiphase I/O communication functions, because this phase-based communication of bits between processors allows for valid instructions to be executed at one processor during one step, while another processor is currently executing, or about to execute, an invalid instruction (i.e., an instruction that does not have all of the requisite parameters or otherwise produces useless outputs), and is therefore waiting for inputs that would make this other processor's current or upcoming instruction step valid (i.e., the processor will produce useful data the next time the invalid instruction is executed).

Emulation Chips and Processor Clusters

Figure 2:
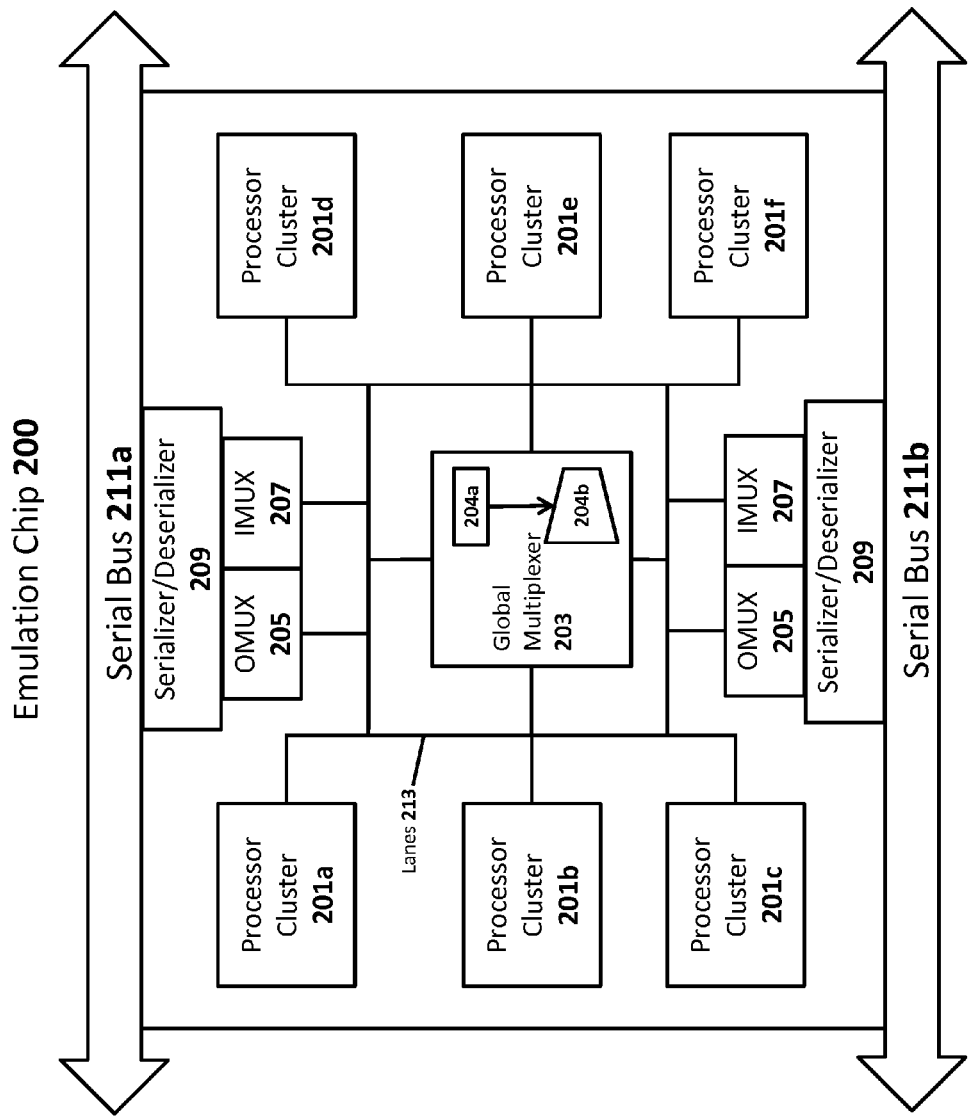
FIG. 2 shows a schematic diagram of an emulation chip, according to an exemplary embodiment.

FIG. 2 shows a schematic diagram of an emulation chip 200, according to an exemplary embodiment. The exemplary emulation chip 200 may comprise processor clusters 201, a global multiplexer 203 (GMUX 203), output multiplexers (OMUXs 205), input multiplexers (IMUXs 207), serializer-deserializers 209, and serial buses 211. It should be appreciated that, although the exemplary embodiments described herein mention serial buses 211 and serialized data communications, embodiments do not necessarily rely upon the data signals being serialized. As such, it should be appreciated that, in some embodiments, the data communications may be done in parallel, and may or may not comprise serializer-deserializers 209 or serial buses 211. In operation, processor clusters 201 may produce and transmit a set of one or more bits (represented by data signals) over the chip's 200 data lanes to the GMUX 203; the GMUX 203 may, in turn, forward the one or more bits to a destination resource, which may be a processor cluster 201 or a particular processor on the chip 200. In some cases, the destination may be located on a second emulation chip. In such cases, data may be transmitted to an OMUX 205 configured to connect the processors or clusters 201 of the emulation chip 200 to a serial bus 211 that connects a number of emulation chips 200. Additionally or alternatively, in some cases, a cluster 201 or a processor of the emulation chip 200 may receive data from a different emulation chip, via the serial bus 211. In such cases, the data may be received by an input multiplexer (IMUX 207), which may also be configured to connect the processors or clusters 201 of the emulation chip 200 to a serial bus 211. It should be appreciated that the functions and features described in this exemplary embodiment may be varied, such that additional or alternative features may be included into the components of the system 200, certain features and functions may be aggregated into a fewer multiplexers, and/or certain features and functions may be disaggregated into additional multiplexers.

A processor cluster 201 may be a collection of one or more processors performing various logical functions associated with emulating a logic system, such as an ASIC, currently being prototyped by the emulation system. Each processor cluster 201 may comprise any number of processors, or clusters of clusters. For example, in some embodiments, a cluster 201 may comprise a single processor; and, in some cases, the cluster 201 may comprise, e.g., four or eight processors. In some embodiments, processor cluster 201 may comprise a cluster of clusters. For example, eight clusters 201 may be clustered with eight other clusters 201, to form a cluster 201 of sixty-four processors. It should be appreciated that a chip 200 may comprise multiple clusters 201, each of which may have the same or different clustering pattern. In some embodiments, the processors of a cluster 201 may each execute instructions from a dedicated instruction set (i.e., an instruction set per LUT), which means that each processor may produce its own output bits. In such embodiments, the processor cluster 201 may further comprise a processor output multiplexer (not shown), which may determine the set of bits ultimately output by the processor cluster 201. The resulting output bits from a cluster 201 may then be transmitted to a GMUX 203 or an OMUX 205.

A processor cluster 201 may be interconnected to other clusters 201 by parallel data lanes 213, serial buses 211, or any combination of the two. Data lanes 213 and serial buses 211 may comprise any material (e.g., copper, fiber optics, gold) capable of being a medium for transmitting data signals between clusters 201, or other resources of the chip 200 (e.g., memories). In operation, the data lanes 213 and serial buses 211 may be the medium used for transmitting a set of one or more bits (i.e., data represented by the data signals) between clusters 201 and multiplexers 203, 205, 207. After performing Boolean functions, a cluster 201 produces logical results (i.e., one or more output bits), which the cluster 201 may transmit to a destination resource (e.g., memory, multiplexer) according to the instruction set or sets associated with that cluster 201. For example, after performing a series of Boolean functions, a cluster 201a may determine to, based on the instruction sets of that cluster 201a, transmit the output bits to a data memory array (not shown) for that cluster 201a, or the cluster 201a may transmit the output bits to another processor or cluster 201b in the emulation system.

Figure 4:
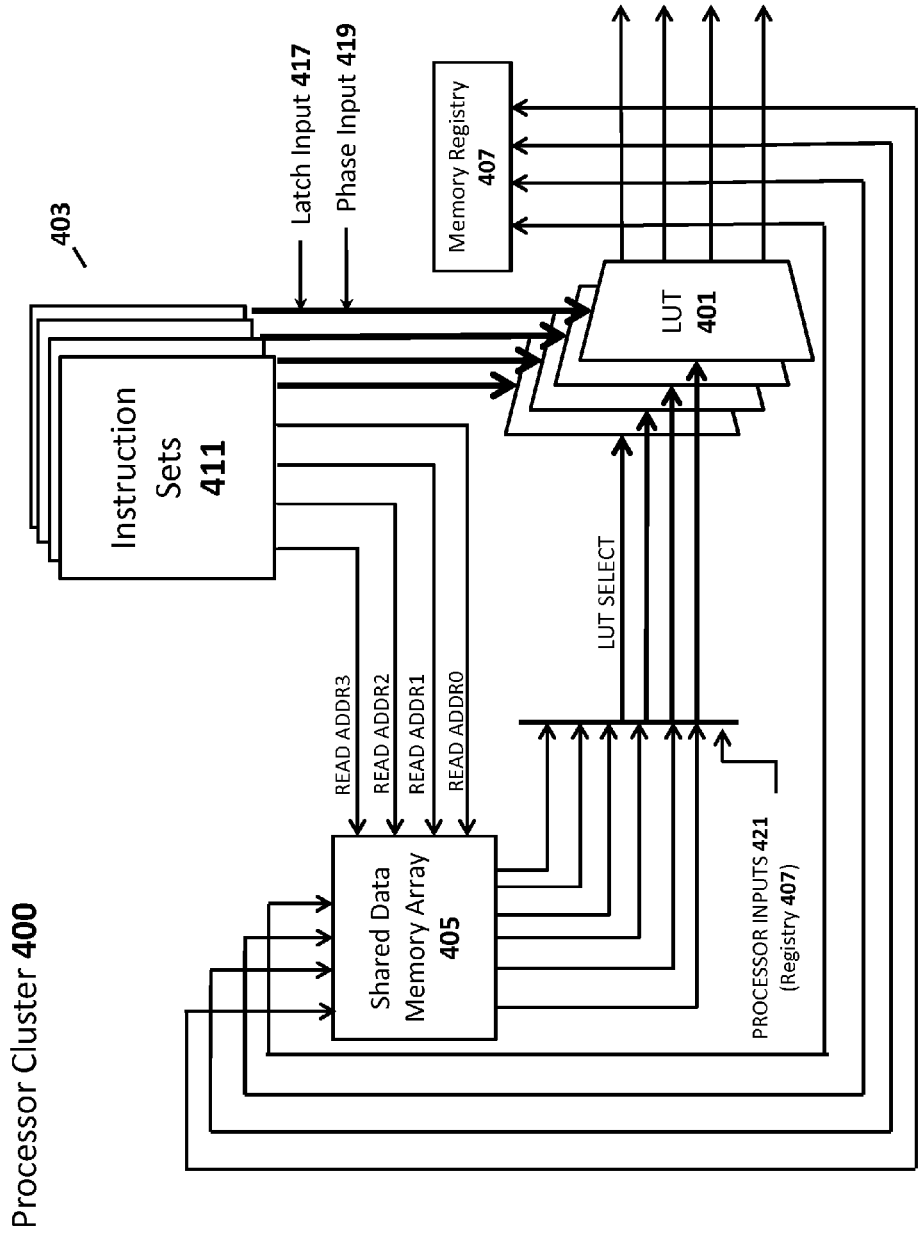
FIG. 4 shows an exemplary processor cluster comprising a cluster of four processors.

Data lanes 213 may comprise any material capable of hosting transmitted data signals between component resources of the emulation chip 200. Although the data lanes 213 are shown in FIG. 4 as a single line, it should be appreciated that there may be any number of parallel data lanes 213 interconnecting components of the chip 200. Such parallel data lanes 213 may transmit a number of data signals into a single multiplexer 203, 205, 207, which the multiplexer 203, 205, 207 may then use to execute certain logical functions according to the multiplexer's 203, 205, 207 instruction set.

Serial buses 211 may comprise any material capable of transmitting data signals from processor clusters 201 to destinations in the emulation system that are not located on the chip 200, such as a second emulation chip, an external memory drive, a second logical board (different from the logical board housing the emulation chip 200), or any other computing resource of the emulation system that is not housed on the emulation chip 200. In the exemplary embodiment, the emulation chip comprises multiple serial buses 211—a first serial bus 211a configured to transmit a processor cluster's 201 outputted data signals to other emulation chips (not shown) on the same logical board (not shown), and a second serial bus 211b configured to transmit a processor cluster's 201 outputted data signals to other emulation chips (not shown) on a different logical board (not shown). Serial buses 211 may be configured to convey outputted data signals in a serialized configuration. That is, data signals outputted from processor clusters 201 may be arrive at the serial bus 211 via parallel data lanes 213. These data signals may then be organized into streams of data, as opposed to parallel data lanes 213, which is then transmitted over the serial bus 211 to the appropriate destination.

A global multiplexer (GMUX 203) may be responsible for interconnecting clusters 201 or processors on the emulation chip 200, thereby facilitating data signal exchanges between the clusters 201. For example, the GMUX 203 may receive data inputs, outputted from a number of clusters 201a-f; and then, based on the instruction set informing GMUX's 203 behavior, the GMUX 203 may select a data value from the inputs received from, e.g., a first cluster 201a, which the GMUX 203 then drives back into the same first cluster 201a or onward to a second cluster 201b. In some implementations, this is the main technique by which processors within each cluster 201 communicates data to other processors within the same or different clusters 201. Although the exemplary embodiment comprises a GMUX 203 that routes data signals between processor clusters 201 found on the same emulation chip 200, it should also be appreciated that, in some embodiments, a GMUX 203 may be configured to route data signals from processor clusters 201 to an OMUX 205 or IMUX 207 of the emulation chip 200, thereby allowing the GMUX 203 to influence data-routing to and from other emulation chips (not shown).

The GMUX 203 may comprise a GMUX instruction store 204a and a multiplexer crossbar 204b. The GMUX instruction store 204a may be a non-transitory machine-readable storage medium configured to store a set of instructions that control the GMUX's 203 operation. In some cases, the instructions may be downloaded to the GMUX instruction store 204a from an instruction database (not shown) at download time, or distributed directly by a compiler module or a configuration module. The instruction set stored in the GMUX instruction store 204a may control the logical behavior of the GMUX crossbar 204b. In operation, the GMUX crossbar 204b may, based on the instructions in the GMUX instruction store 204a, select a set of one or more inputs from the data signals received from one or more processor clusters 201, perform zero or more operations on the inputs, and output data (i.e., transmit a data signal) to a destination cluster 201 or processor. Although, FIG. 2 shows an emulation chip 200 having only one GMUX, 203, it should be appreciated that, in some embodiments, an emulation chip 200 may comprise zero or more GMUXs 203.

An OMUX 205 may be responsible for routing data signals from processor clusters 201 of the emulation chip 200 to destination resources in the emulation system not housed on the emulation chip 200. In some cases, such data signal routing uses a serial bus 211, such that the OMUX 205 may route data signals from processors to the serial bus 211. The OMUX 205 may execute its routing functions based on an OMUX instruction set stored in an OMUX instruction store (not shown); these OMUX 205 functions may include receiving data from processor clusters 201 through parallel data lanes 213, selecting a set of one or more input bits from the data signals received from the clusters 201, performing one or more operations using the bits received in the data signals from the clusters 201, outputting data signals to processor clusters 201, outputting data signals to serial buses 211, and serializing data bits into a data stream when the bits are received as parallel data signals through parallel data lanes 213.

In some embodiments, the OMUX 205 may optionally comprise a serializer 209, which may be a function of the OMUX 205 or a second multiplexer crossbar that is also a component of the OMUX 205. In such embodiments, the serializer 209 may be responsible for outputting a data stream to a serial bus 211. That is, this serializer 209 aspect of the OMUX 205 provides the OMUX 205 the ability to receive parallel bits, through parallel data lanes 213, but then output an ordered data stream comprising the appropriate bits of data. In some embodiments, the serializer 209 may be distinct multiplexer component of the emulation chip 200. In such embodiments, the OMUX 205 may output a set of bits to the serializer through parallel data lanes 213, where the serializer will then generate a data stream for transmission over a serial bus 211.

An IMUX 207 may be responsible for routing data signals from source resources in the emulation system that are not housed on the emulation chip 200, to destination resources on the emulation chip 200 (e.g., processor clusters 201). In some cases, the data signals arrive at the IMUX 207 through a serial bus 211, which may host data streams of serialized bits transmitted between emulation chips 200 or emulation logic boards. The IMUX 207 may, based on an IMUX instruction set stored in an IMUX instruction memory (not shown), receive data bits of a data stream from a serial bus 211, perform any number of logical operations on the data bits of the data stream, generate a set of output bits, output parallel data signals containing the set of bits, and route the parallel data signals to clusters 201 or specific processors on the emulation chip 200. As mentioned, the IMUX 207 may execute its logical operations and routing functions based on an IMUX instruction set stored in an IMUX instruction store (not shown).

In some embodiments, the IMUX 207 may optionally comprise a deserializer 209, which may be a function of the IMUX 207 or a second multiplexer crossbar that is also a component of the IMUX 207. In such embodiments, the deserializer 209 function or multiplexer may be responsible for outputting a set of bits in the form of parallel data signals through parallel data lanes 213. That is, the deserializer 209 functions or features provides the IMUX 207 the capability to receive a data stream of serialized bits, through a serial bus 211, and then output parallel data signals containing bits of data. In some embodiments, the deserializer 209 may be distinct multiplexer component of the emulation chip 200. In such embodiments, the IMUX 207 may receive a data stream of serialized bits, then, based on an instruction set of the IMUX 207, generate a set data signals, and output the set of data signals to processor clusters 201 or a GMUX 203 through parallel data lanes 213.

Emulation Processors

Figure 3:
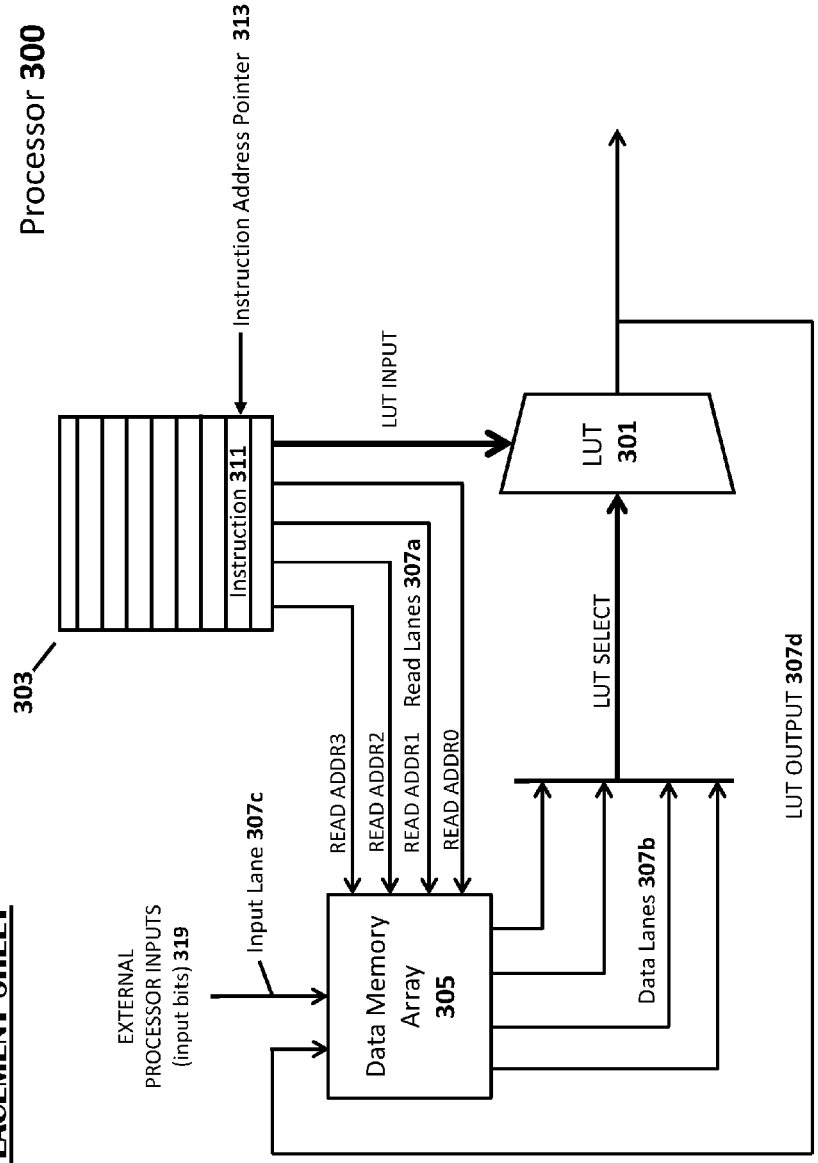
FIG. 3 shows components of a processor within an emulation chip, according to an exemplary system embodiment.

FIG. 3 shows components of a processor 300 within an emulation chip, according to an exemplary system embodiment. A processor 300 may comprise a lookup table (LUT) 301, an instruction memory 303, and signal lanes 307 connecting the components of the processor 300 to one another and to external processors. In operation, a processor 300 may sequentially read instructions 311 from a corresponding instruction memory 303 associated with the processor 300 that stores instructions for the processor 300 to execute. An instruction 311 may contain bits that may be used by the processor 300 to determine which bits should be read from a data memory array 305 or other input source. The bits read from the data memory 305 may then be fed to a LUT 301, which may be a particular type of multiplexer controlled by the current instruction 311. The result of a LUT 301 performing its various functions may produce an output bit. In some cases, this output bit may then be transmitted along a LUT output lane 307d to the data memory 305 for storage. In these cases, the data memory 305 may store any number of output bits resulting from any number of previous LUT 301 evaluations. Additionally or alternatively, the data memory 305 may receive over a processor input lane 307, input bits 319 arriving from a bit source external to the processor 300, including bits transmitted from other processors 300. In other words, the LUT 301 not only has access to previous results of the processor 300 stored in the data memory 305, but the LUT 301 may also access values (e.g., input bits) from outside the processor 300.

A LUT 301 may be a circuit multiplexer (MUX) configured to represent (i.e., execute or otherwise perform) any Boolean function, thus allowing the emulation of most any function that could be produced by the ASIC currently being emulated. A LUT 301 may comprise one or more circuit crossbars, which may comprise a set of one or more switches. It would be appreciated by one skilled in the art that the switches of the LUT 301 crossbars may be configured as a series of circuitry interconnects, which may be enabled or disabled according to a transistor or other component, such that the switches of the crossbar may select inputted data signals, perform logical functions on the selected data signals, and output data signals, when the transistor enables or disables certain interconnects. An instruction set, stored in an instruction memory 303, may provide instructions to the circuitry of the LUT's 301 crossbars. In many cases, the Boolean functions capable of being executed by the LUT 301 have the same number of inputs (i.e., function parameters) as the number of select inputs leading into the LUT 301. For example, the LUT 301 shown in FIG. 3 may be a so-called "four-way" MUX that has four data inputs but only two select inputs. As such, by varying the values received from the four data inputs, the LUT 301 may allow the processor 300 to emulate any Boolean function requiring two bits. Likewise, the size of the Boolean functions that can be emulated using the LUTs 301 can be increased or decreased by adding or removing the number of select inputs fed into the LUTs 301. For example, in some embodiments, processors 300 of an emulation chip may comprise LUTs 301 with four inputs (i.e., "LUT4"), which allows each of these processors 300 to perform any four-bit Boolean function. However, it should be appreciated that there is no limitation upon the number of selectable inputs associated with the LUTs 301 of an emulation chip.

An emulation chip may further comprise an instruction memory 303, which may be a non-transitory machine-readable storage media configured store a set of instructions 311 for the processor 300 (i.e., the LUT 301) to use for performing emulation functions. The emulation system may compile machine-readable code containing the functions of the ASIC being emulated. The result of compilation is virtual logic containing the programmatic logic representing the functional designs of the emulated ASIC. After compilation, the virtual logic is parsed into various instruction sets that may be distributed, or "downloaded," into the various instruction memories 303 of the emulation chips. During compilation, the instruction sets were generated with the expectation that the instruction sets will be provided to specific processors 300 or MUXs. As such, in many cases, the instruction sets are downloaded into predetermined instruction memories 303 according to the input and output destinations of the respective instructions 311 of each instruction set. Upon compiling a netlist file representing the design of the logic system being tested, the resulting instruction set may be stored into the instruction memory 303, where each instruction 311 is stored into an individual memory address within the instruction memory 303. An instruction address pointer 313 may identify each respective instruction address on behalf of processor 300, such that the processor's 300 components may retrieve and execute each individual instruction 311. In some embodiments, the processor 300 may be configured to sequentially execute each instruction 311, using an instruction address pointer 313. In such embodiments, the instruction address pointer 313 may be incremented as each sequential instruction 311 is executed by the processor's 300 components.

The processor 300 may be associated with a data memory 305 comprising non-transitory machine-readable storage media configured to store, e.g., processor results and/or inputs. In some cases, the data memory 305 may be a component of the processor 300. In some cases, the data memory 305 may be communicatively coupled to a plurality of processors 300, such that the data memory 305 is accessible by a cluster of processors 300. The data memory 305 may store results of the processor's 300 evaluations (i.e., LUT 301 function output), or inputs to the processor 300 from external sources (e.g., external processors). As shown in FIG. 3, the data memory 305 may comprise a number of single-bit read (i.e., input) ports, often equal to the number of select inputs of the processor (in this example, there are four). The data memory 305 may also have "write" ports, such as the write port to write the result of a LUT 301 evaluation, or the write port to receive processor inputs from external sources. The data memory 305 may store a number of emulation steps that correspond to a clock-cycle of the logic system being emulated. The data stored in the data memory 305 may represent the state of the emulated logic system.

Processor Clusters

Clustering may facilitate expansion of the capabilities of the emulation system because the processors may have limitations on the number of logic gates the processors can emulate for a particular ASIC or other logic system. In some cases, clusters may be more efficient in prototyping logic system functions because of the increased processing power and functionality. In some embodiments, clusters of processors may be clustered into "clusters of clusters."

FIG. 4 shows an exemplary processor cluster 400 comprising a cluster of four processors. A processor cluster 400 may often comprise one or more multiplexers 401 that share a common memory array 405 or some other resource. In some cases, clusters 400 may be capable of performing increasingly more complex logical functions. As such, clusters 400 may be capable of prototyping increasingly more complex functions of the ASIC or other logic system. Like with individual processor multiplexers 401, the exemplary processor cluster 400 of an emulation chip comprises any number of multiplexers 401 that perform simple Boolean computations, according to a control logic program or simple set of logical rules, which may be in an instruction memory 403 as instruction sets 411. In the cluster 400, the multiplexers 401 may share a single data array memory 405, and may also output larger results to the same destination resource. This allows for the cluster 400 to emulate more intricate functions of the prototyped logic system, because more bits may be processed, stored, or output, thus more complex functions may be modeled. In the exemplary embodiment, one or more processors of the cluster 400 may be able to "latch" different data outputs onto different phases. To capture these data outputs, a processor may comprise a memory registry 407 that enables the particular processor, or the cluster 400 as a whole, to store the different data outputs, as the different data outputs are produced on different phases.

A cluster 400 may comprise one or more memory registries 407, which may be a non-transitory machine-readable storage medium configured to store outputs from the cluster multiplexers 401. A registry 407 may be communicatively coupled, through one or more data lanes, to a cluster 400 of one or more processors, or a cluster of clusters. After multiplexers 401 produce one or more output signals or bits according to an instruction, the resulting output may be transmitted to a destination resource, as determined by the instruction or other input parameter controlling multiplexer 401 behaviors. In some cases, a multiplexer 401 may receive a latch input 417 and/or a phase input 419, which may instruct the multiplexer to store the output data into a memory registry 407. In this way, data outputs may be stored in a physically proximate location that is quickly accessible to the cluster 400 for future processing. In other words, the latch input 417 may indicate that the cluster's 400 outputs should be stored for later use. In some circumstances, this may allow the cluster 400 to store data needed for a later instruction, where the instruction still requires additional inputs. While the cluster 400 awaits those other inputs, the multiplexers 401 may store the output into the memory registry and proceed with executing additional instructions.

In some embodiments, a phase input 419 may indicate which phase the system is executing. In some cases, the phase input 419 may be a sequential counter indicating the number of passes or cycles through the instructions sets 411 the cluster 400 has completed. In some cases, the phase input 419 may alternate between two or more phases, which may inform the cluster's 400 behaviors. That is, the cluster 400 may input and output different functional results modeling different aspects of the ASIC or other logic system, depending upon which phase the cluster is executing 400. To this end, the cluster may store data related to a first phase in the memory registry 407, then execute any number of instructions related to a second phase, and then continue to use process the data related to the first phase by retrieving the data stored in the memory registry 407. Although the processors of the exemplary cluster 400 are shown as latching input data and a phase input 419 for determining whether to store outputs into the memory registry 407, it should be appreciated that, in some embodiments, the multiplexers 401 may be instructed to transmit outputs to the memory registry 407, based on a latch input 417 or a phase input 419.

To reuse the data stored in the memory registry 407, multiplexers 401 may, according to an instruction, select a processor input 421 lane coupling the memory registry 407 to the multiplexers 401. In some embodiments, the instruction may indicate that the multiplexer 401 should reference the processor input 421 lane; and in some embodiments, a phase input 419 received by the multiplexers 401 may instruct the multiplexers to select the processor input 421 coupled to the memory registry 407. In an alternating phase embodiment, the cluster 400 may reference data stored in the memory registry 407 to continue processing a function related to a first phase, where that data was stored previously into the memory registry 407 during a second phase. Processor inputs 421 may be a data input for receiving inputs from a data memory array 405 or from resources external to the processor or cluster 400. Through the processor inputs 421, the processors may receive and selects data signals from the serial bus, IMUX, other clusters 400, or a registry memory 407. In some embodiments, one or more types of processor inputs 421 arrive at a cluster 400 through an IMUX, and the IMUX routes the inputs to the various processors of the cluster 400, where they arrive at the processors or multiplexers 401 at a port called the processor input 421.

It should be appreciated that clusters of processors 400 for a given emulation chip may be formed into any organizational structure, and that nothing described herein should be construed as limiting on the possible organizational structure of the resources. In some cases, for example, clusters may be clustered, thereby forming clusters of clusters.

Output Multiplexers and Input Multiplexers

As discussed herein, emulation systems may comprise various types of multiplexers with different tasks and responsibilities, such as IMUXs and OMUXs. An IMUX may receive data bits arriving from various resources, such as processors, and then forward one or more selected bits onward to one or more subsequent processors, in accordance with the IMUX's instruction set. Likewise, an OMUX may receive one or more bits being outputted by a processor and then transmit one or more of those bits to one or more selected resources, in accordance with the OMUX's instruction set. When an emulation system employs multiphase I/O capabilities, IMUXs and/or OMUXs may be configured to operate differently from one phase to the next. Ordinarily, IMUXs and OMUXs may determine which bit to select from one or more arriving bits according to an instruction in the instruction set. Likewise, the instruction set may inform IMUXs and OMUXs which bit to forward onwards or identifies the appropriate destination resource for the bit. In multiphase I/O, one or more I/O Phase bits are controlled by the emulation system, and allow IMUXs and/or OMUXs to behave differently among one or more phases based upon which of the one or more phases is indicated by the one or more I/O Phase bits. It should be appreciated that an IMUX, an OMUX, or both an IMUX and an OMUX, may be configured to make data bit I/O selections that are controlled by the phase of the system.

Figure 5:
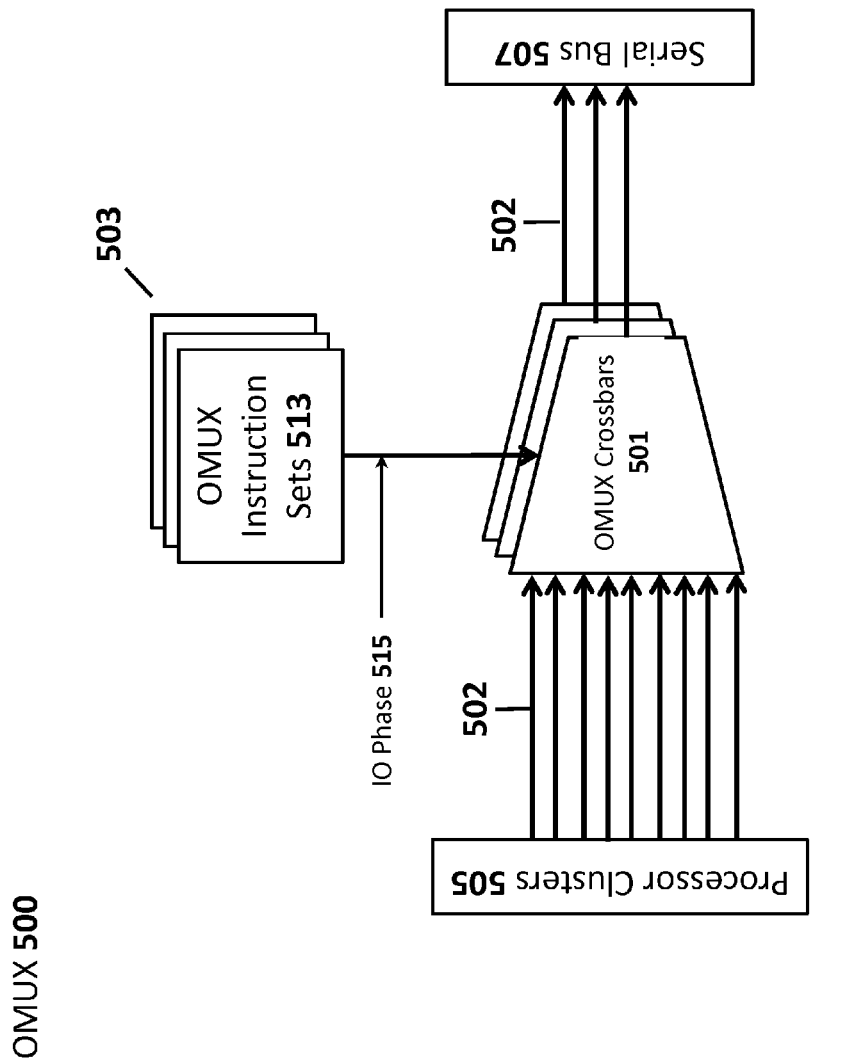
FIG. 5 shows a schematic diagram representing an OMUX, according to an exemplary embodiment.

FIG. 5 shows a schematic diagram representing an OMUX 500, according to an exemplary embodiment. An OMUX 500 may comprise crossbars 501, parallel data lanes 502, and instruction memories 503. In operation, the OMUX 500 may receive data signals over data lanes 502 from processor clusters 505, perform various functions based on an OMUX instruction set 513, and then transmit the results as data signals over data lanes 502 to a serial bus 507.

An OMUX 500 may comprise one or more OMUX crossbars 501, which may comprise a set of one or more switches. It should be appreciated by one skilled in the art that the switches of the OMUX crossbar 501 may be configured as a series of circuitry interconnects that may be enabled or disabled according to a transistor or other component, such that the switches of the crossbar may select inputted data signals, perform logical functions on the selected data signals, and output data signals, by the transistor enabling or disabling certain interconnects. An OMUX instruction set 513, stored in an OMUX instruction memory 503, may provide instructions to the circuitry of the OMUX crossbars 501. For example, the OMUX crossbars 501 may receive multiple data signals from a plurality of processor clusters 505 through the parallel data lanes 502. The OMUX crossbars 501 may select the appropriate inputs, as dictated by the instructions of the instruction set 513, and then route a set of outputs to the serial bus 507. In some cases, the OMUX crossbar 501 may function as a chokepoint, selecting only a handful of processor cluster 505 outputs to then forward to the serial bus 507. In some cases, the OMUX crossbar 501 may aggregate the bits of the inputted data signals, or parse out a subset of the bits from the inputted data signals, based on the instructions of the instruction set 513. In some cases, the OMUX crossbar 501 may perform logical functions using the inputted data bits. The OMUX crossbars 501 may then route through the parallel data lanes 502 the output data signals to a destination resource of a different emulation chip. In some cases, data routed to destination resources on a different emulation chip may be transmitted via a serial bus 507. In some embodiments, the OMUX 500 may comprise a serializer function that may be performed by the OMUX crossbar 501. In some embodiments, the OMUX crossbar 501 may route outputted signals to a serializer component associated with the serial bus 507. As previously mentioned, it should be appreciated that it is not required for an emulation system to comprise a serial bus 507, nor is it required for an OMUX 500 to be coupled to a serial bus 507 for the OMUX 500 to be capable of executing multiphase I/O capabilities. As such, in some embodiments, the OMUX 500 may be configured to drive a parallel bus coupled to the OMUX 500, instead of a serial bus 507 as described in the exemplary embodiment.

The OMUX instruction memory 503 may be a non-transitory machine-readable storage medium configured to receive and store an instruction set 513 from a database (not shown) of the emulation system. The database may store instructions sets in any format (e.g., compiled virtual logic) after the instructions sets are compiled from the netlist. That is, after compiling the netlist, the emulation system may store instruction sets into a database. During a "download" time, instruction memories, such as the OMUX instruction memory 503, may download or otherwise receive the instruction set 513 compiled for the particular OMUX crossbar 501. The OMUX instruction set 513 may contain instructions for the OMUX crossbar 501 to select data signal inputs, perform any number of functions on the data bits represented by the data signals, and route the resulting output data signals to a predetermined destination resource. An OMUX 500 may interconnect processor clusters 505 of different emulation chips. In this role, the instructions may contain the predetermined destination resource on a different emulation chip, or the instructions may inform the OMUX crossbar 501 on how to determine the appropriate destination resource. The OMUX 500 may then route the data signals from the processor clusters 505 to the appropriate destination resource, which may require the OMUX 500 to route the data signals to an intermediary serial bus 507 that is configured to carry data transmissions between chips.

In some embodiments, the OMUX 500 may support a multiphase I/O execution mode, whereby the OMUX 500 may, depending upon an execution phase, select data inputs to transmit from different sources on different phases. In such embodiments, the OMUX 500 may receive an I/O Phase input 515, which may indicate which execution phase the system is currently executing, and may instruct the OMUX crossbars 501 on which data input or inputs to select. A sequencer module, which may control which step number of the instruction sets each of the multiplexers of the emulation system should be executing, may generate and transmit the I/O Phase input 515 to the OMUX 500. By alternating through two or more I/O Phase input 515 values, the various phases allows different signals to be routed during different phases of the emulation cycle, increasing the number of I/O transmissions performed by the OMUX 500. Similarly, in some embodiments where the OMUX 500 supports a multiphase I/O execution mode, the OMUX 500 may, depending upon the execution phase, dynamically select a data output to transmit to different destinations on different phases. In such embodiments, the OMUX 500 may receive an I/O Phase input 515, indicating which execution phase the system is currently executing, and may dynamically instruct the OMUX crossbars 501 as to which resource destination to transmit the data output. As previously mentioned, a sequencer module may control which step number (of the instruction sets) the multiplexers should be executing. In operation, the sequencer module generates and transmits the I/O phase input 515 to the OMUX 500.

Figure 6:
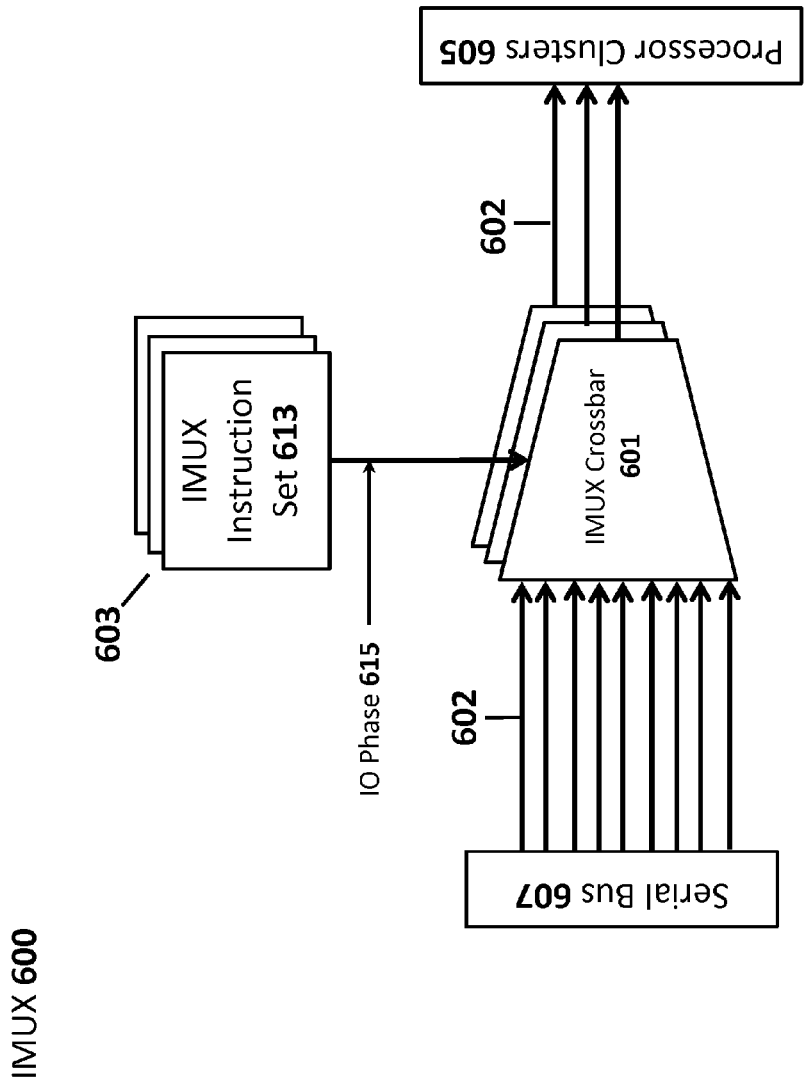
FIG. 6 shows a schematic diagram representing an IMUX, according to an exemplary embodiment.

FIG. 6 shows a schematic diagram representing an IMUX 600, according to an exemplary embodiment. An IMUX 600 may comprise IMUX crossbars 601, parallel data lanes 602, and instruction memories 603. In operation, the IMUX 600 may receive serialized bits as a data stream from a different resources, such as different emulation chip (often, but not always, via a serial bus 607), then performs various functions based on an IMUX instruction set 613, and then the IMUX 600 may transmit the results as data signals over data lanes 602 to one or more processor clusters 605 of the emulation chip. As previously mentioned, it should be appreciated that it is not required for an emulation system to comprise a serial bus 607, nor is it required for an IMUX 600 to be coupled to a serial bus 607 for the IMUX 600 to be capable of executing multiphase I/O capabilities. As such, in some embodiments, the IMUX 600 may be configured to drive a parallel bus coupled to the IMUX 600, instead of a serial bus 607, as described in the exemplary embodiment.

An IMUX 600 may comprise one or more IMUX crossbars 601, which may comprise a set of one or more switches. It should be appreciated by one skilled in the art that the switches of the IMUX crossbar 601 may be configured as a series of circuitry interconnects that may be enabled or disabled according to a transistor or other component, such that the switches of the IMUX crossbar 601 may select inputted data signals, perform logical functions on the selected data signals, and output data signals, by the transistor enabling or disabling certain interconnects. An IMUX instruction set 613, stored in an IMUX instruction memory 603, may provide instructions to the circuitry of the IMUX crossbars 601. For example, the IMUX crossbars 601 may receive multiple data signals from any number of emulation chips (not shown) through a serial bus 607, which may arrive at the IMUX crossbars 601 directly from a serial bus 607, or the inputs may be received by the IMUX crossbars 601 through parallel data lanes 602 after the data streams are deserialized. The IMUX crossbars 601 may select the appropriate inputs, as dictated by the instructions of the IMUX instruction set 613, and then route a set of outputs to the processor clusters 605 of the emulation chip. In some cases, the IMUX crossbars 601 may function as a chokepoint, i.e., selecting only a handful of inputs to then forward to the processor clusters 605. In some cases, the IMUX crossbars 601 may be based on the instructions of the IMUX instruction sets 613, aggregate the bits of the inputted data signals or parse out a subset of the bits from the inputted data signals. In some cases, the IMUX crossbars 601 may perform logical functions using the inputted data bits. The IMUX crossbars 601 may then route, through the parallel data lanes 602, output data signals to a destination processor cluster 605. In some embodiments, the IMUX 600 may comprise a deserializer function that may be performed by the IMUX crossbars 601. In some embodiments, the IMUX crossbars 601 may receive inputted signals from a deserializer component associated with the serial bus 607.

The IMUX instruction memory 603 may be a non-transitory machine-readable storage medium configured to receive and store an IMUX instruction set 613 from a database (not shown) of the emulation system. After the instruction sets 613 are compiled using the netlist, the emulation system may store instruction sets 613 into a database, and the database may store the instructions sets 613 in any format (e.g., compiled virtual logic). During a "download" time, the IMUX instruction memory 603, may download or otherwise receive the IMUX instruction set 613 compiled for the particular IMUX crossbar 601. The IMUX instruction set 613 may contain instructions for the IMUX crossbars 601 to select data signal inputs, perform any number of functions on the data bits represented by the data signals, and route the resulting output data signals to a predetermined destination resource. An IMUX 600 may interconnect processor clusters 605 of different emulation chips. In this role, the instructions in the IMUX instruction set 613 may contain the predetermined destination processor cluster 605 of an emulation chip, which will be the destination for an input received by the IMUX 600 from a different emulation chip, or the instructions may inform the IMUX crossbars 601 on how to determine the appropriate destination processor cluster 605. The IMUX 600 may then route the data signals from the serial bus 607 to the appropriate destination processor clusters 605.

In some embodiments, the IMUX 600 may support a multiphase I/O execution mode, whereby the IMUX 600 may, depending upon an execution phase, select from one or more data inputs arriving from one or more resources. In the exemplary IMUX 600, bits arriving from a plurality of different emulation chips are deserialized and placed onto parallel data lanes 602, from which the IMUX crossbars 601 may select one or more of the arriving bits, in accordance with an instruction in the IMUX instruction set 613. In such multiphase I/O embodiments, the IMUX 600 may receive an I/O Phase input 615 indicating which execution phase the system is currently executing, which may contribute to instructing the IMUX crossbars 601 on which data input or inputs to select from the incoming data lanes 602. As previously mentioned, a sequencer module of the emulation system may be responsible for setting and promulgating the I/O Phase input 615, which indicates the appropriate execution step number that each of the multiplexers of the emulation system should be executing. By alternating through two or more values for one or more I/O Phase inputs 615, the IMUX 600 may select different signals from the data lanes 602. Similarly, in some embodiments where the IMUX 600 supports a multiphase I/O execution mode, the IMUX 600 may, depending upon the execution phase indicated by the I/O Phase input 615, dynamically identify to which resource within an emulation chip (e.g., processor, processor clusters 605) to transmit data outputs, at different phases. In such embodiments, the IMUX 600 may receive an I/O Phase input 615, indicating which execution phase the system is currently executing, and may dynamically instruct the IMUX crossbars 601 as to which processor or processor cluster 605 to transmit the data output.

Multiphase Instruction Store

Figure 7:
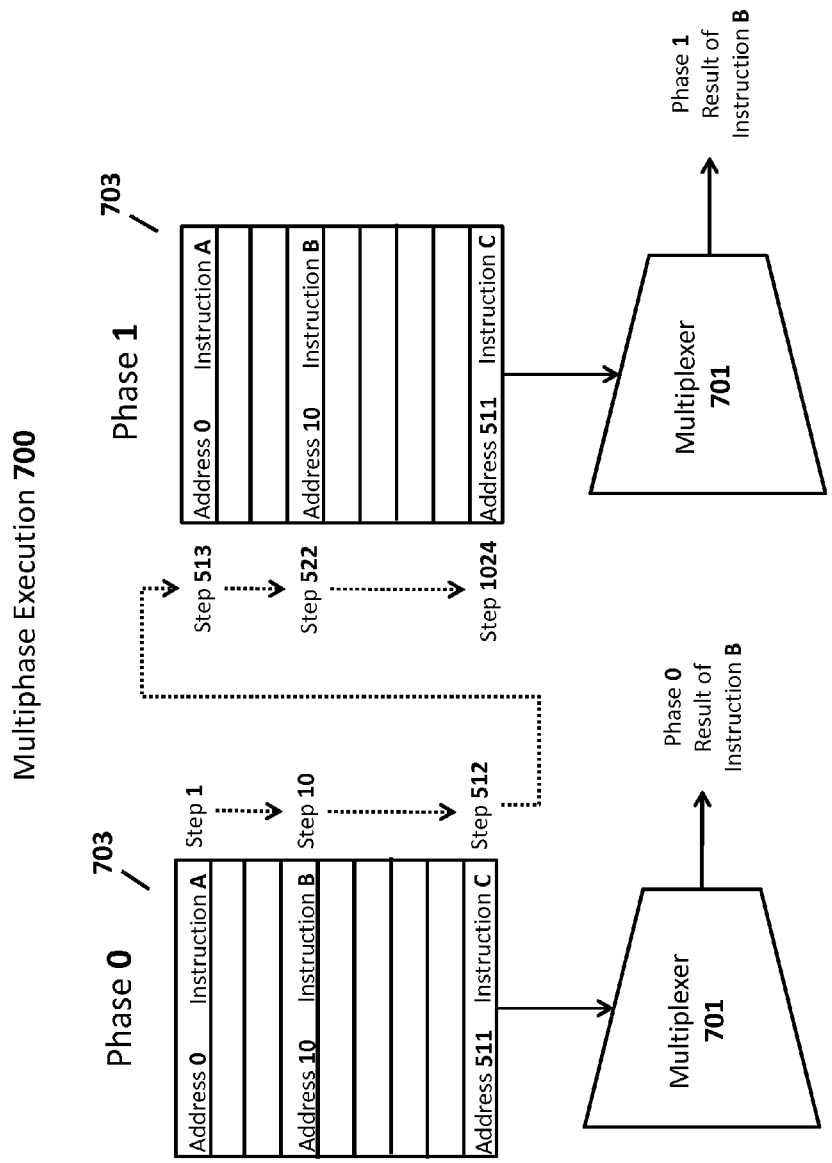
FIG. 7 shows an exemplary processor operating in two phases: a first phase (Phase 0) and a second phase (Phase 1).

FIG. 7 shows an exemplary processor 700 in two phases, a first phase (Phase 0) and a second phase (Phase 1). The exemplary processor may comprise an instruction memory 703 with 512 memory addresses (addresses 0-511), which may store instructions A-C that are sequentially executed by a multiplexer 701 during a 512-step execution cycle (steps 1-512). Based on the instruction A-C, and based on the phase, the multiplexer 701 may generate and output results.

Prior to execution, Phase 0 may represent the state of the processor 700 as it was compiled. In this example, instruction B located at address 10 may produce an invalid result because it requires inputs that are not yet ready; the inputs are expected to be received at step 300. When the execution begins, the processor 700 may begin, at step 1, executing instruction A at address 0. Instruction B may be executed, however the result may not be useful or may be invalid, and is thus routed such that it does not disrupt the emulation system. At step 300, the system may receive the inputs for instruction B, which may be used in Phase 1. After completing step 512, the processor 700 moves to the next emulation cycle, and thus the next phase of execution.

In Phase 1, the processor 700 may perform steps 513 through 1024. In step 513, the multiplexer may perform instruction A, as stored in address 0 of the instruction memory 703. In this example, because the input expected for instruction B was received in step 300, the multiplexer may, in Phase 1, produce a valid response when executing instruction B, at step 522. In this way, holes in the instruction set (i.e., instructions resulting in invalid results), such as instruction B, may be minimized and converted from the invalid output that would have resulted from the compiler, into a useful portion of the instruction set in the instruction memory 703. The compiler may be configured to generate and distribute instructions that are designed to execute in multiple phases, such that the components receiving the instruction sets may generate meaningful results more frequently, even while awaiting results from a different emulation processor. In some embodiments, multiphase I/O may be a means for efficiently compacting the location of instructions. In some embodiments, the compiler may produce instruction sets that anticipate the multiple phases, and as such, generate instruction sets that amount to two different emulations or simultaneous instruction sets residing in a single instruction memory 703.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A circuit emulation system comprising:
   a bus configured to host electronic communications; and
   one or more emulation processor circuits, each respective processor circuit comprising:
      a multiplexer communicatively coupled to the bus, the multiplexer configured to, during a first execution phase, execute an instruction of a first instruction set and transmit to the bus a first processor output according to the instruction, and, during a second execution phase, execute a second instruction of the first instruction set and transmit to the bus a second processor output according to the second instruction;
      a cluster of one or more processors communicatively coupled to the multiplexer, wherein a processor of the one or more processors is configured to generate the first processor output during the first execution phase and generate the second processor output from the first processor output during the second execution phase.

2. The system according to claim 1, wherein the multiplexer receives one or more data signals, and selects one or more data inputs from the one or more data signals based upon a phase indicator input.

3. The system according to claim 1, wherein the processor configured to generate the first processor output based on a first processor instruction of a processor instruction set.

4. The system according to claim 3, further comprising a registry memory communicatively coupled to the cluster of one or more processors, the registry memory comprising non-transitory machine-readable storage media configured to store one or more processor outputs.

5. The system according to claim 4, the processor of the cluster of one or more processors further configured to, in response to receiving a latch input, transmit the first processor output to the processor registry memory.

6. The system according to claim 5, the processor further configured to, based on a second processor instruction of the processor instruction set, select the first processor output from the processor registry and generate the second processor output using the first processor output.

7. The system according to claim 3, wherein a processor is further configured to transmit the first processor output to the multiplexer according to the first instruction.

8. A circuit emulation system comprising:
   a bus configured to host electronic communications; and
   one or more emulation processor circuits, each respective processor circuit comprising:
      a registry memory communicatively coupled to at least one processor cluster, the registry memory comprising non-transitory machine-readable storage media configured to store one or more processor outputs; and
      a processor cluster comprising one or more processors, each respective processor configured to, in response to receiving a latch input at a first execution phase, store a first processor output generated according to a first instruction, and, in accordance with a second instruction received at a second execution phase, select the first processor output from the processor registry, and generate a second processor output using the first processor output selected from the processor registry.

9. The system according to claim 8, further comprising a multiplexer communicatively coupled to the bus and configured to generate a multiplexer output using one or more processor inputs according to a multiplexer instruction.

10. The system according to claim 9, wherein the multiplexer is further configured to, during a first execution phase, execute a first multiplexer instruction of a multiplexer instruction set and transmit to the bus a first output according to the first multiplexer instruction, and, during a second execution phase, execute a second multiplexer instruction of the multiplexer instruction set and transmit to the bus a second output according to the second multiplexer instruction.

11. The system according to claim 9, wherein the multiplexer receives one or more data signals, and selects one or more data inputs from the one or more data signals based upon a phase indicator input.

12. The system according to claim 11, wherein the multiplexer is further configured to transmit the multiplexer output to a first destination emulation processor circuit over the bus in response to receiving a first phase indicator.

13. The system according to claim 12, wherein the multiplexer is further configured to transmit the multiplexer output to a second destination emulation processor circuit over the bus in response to receiving a second phase indicator.

14. A computing device-implemented method comprising:
   during a first execution phase:
      generating, by an emulation processor in a cluster of one or more processors of an emulation processing circuit, a first processor output according to a first instruction; and
      storing, by the emulation processor, the first processor output into a registry memory responsive to receiving a latch input indicator with the first instruction, the registry memory comprising non-transitory machine-readable storage media configured to store one or more processor outputs; and
   during a second execution phase:
      generating, by the emulation processor, a second processor output based upon a second instruction; and
   during the first execution phase:

selecting, by the emulation processor, the first processor output stored in the registry memory, from one or more data inputs.

15. The method according to claim 14, further comprising receiving, by the emulation processor, a phase indicator indicating an execution phase.

16. The method according to claim 14, further comprising, during the first execution phase, generating, by the emulation processor, a third processor output using the first processor output, according to the second instruction.

17. The method according to claim 14, wherein generating a second processor output during the second execution phase further comprises:
   transmitting, by the emulation processor, the second processor output to a multiplexer configured to transmit data over a bus to a second emulation processing circuit.

18. The method according to claim 17, wherein the multiplexer is further configured to transmit data over the bus to the one or more emulation processing circuits based upon a phase indicator input.

\* \* \* \* \*